United States Patent [19]

Southwell

[11] Patent Number: 4,934,788
[45] Date of Patent: Jun. 19, 1990

[54] DEPOSITION OF GRADIENT INDEX COATINGS USING COEVAPORATION WITH RATE CONTROL

[75] Inventor: William H. Southwell, Thousand Oaks, Calif.

[73] Assignee: Rockwell International Corporation, El Segundo, Calif.

[21] Appl. No.: 28,356

[22] Filed: Mar. 20, 1987

[51] Int. Cl.$^5$ .................................................. G02B 5/28
[52] U.S. Cl. ....................................... 350/164; 350/166
[58] Field of Search ................................. 350/164, 166

[56] References Cited

U.S. PATENT DOCUMENTS

| 3,271,179 | 9/1966 | Smith | 350/164 |
| 4,583,822 | 4/1986 | Southwell | 350/164 |
| 4,666,250 | 5/1987 | Southwell | 350/166 |

OTHER PUBLICATIONS

MacLeod, H. A.; "Thin-Film Optical Filters"; 1986, pp. 131–136.
Knittl, Zdenek; "Optics of Thin Films"; 1976, pp. 471–479.
Jacobson, R.; "Inhomogeneous and Coevaporated Homogeneous Films for Optical Applications"; Physics of Thin Films; vol. 8, 1975; pp. 51–97.
Jacobson and Martensson; "Evaporated Inhomogeneous Thin Films"; Applied Optics, vol. 5, No. 1; Jan., 1966; pp. 29–34.
Gillett, Phillip; Calculus and Analytic Geometry; 1981; pp. 74–83.
Theeten, Ellipsometric Assessment of (Ga,Al) As/GaAs Epitaxial Layers During Their Growth in an Organometallic VPE System, Journal of Crystal Growth, vol. 46, p. 245 (1979).
Yadava, et al., Optical Behavior of Gradient-Index Multilayer Films, Thin Solid Films, vol. 21, p. 297 (1974).
Berning, Use of Equivalent Films in the Design of Infrared Multilayer Antireflection Coatings, J. of the Optical Soc. of America, vol. 52, p. 431 (1962).
Budde, Photoelectric Analysis of Polarized Light, Applied Optics, vol. 1, p. 201 (1962).

(List continued on next page.)

Primary Examiner—Bruce Y. Arnold
Assistant Examiner—Terry S. Gallagher
Attorney, Agent, or Firm—John J. Deinken

[57] ABSTRACT

A method of depositing an optical coating with a predetermined refractive index n and a thickness d, using a first source material having a refractive index $n_H$ greater than n and a known rate of deposition $r_H$ and a second source material having a refractive index $n_L$ less than n and a variable rate of deposition $r_L$, requires calculating the deposition rate $r_L$ according to the equation $$r_L = \frac{(n_H^2 - n^2)}{(n^2 - n_L^2)} r_H$$

and depositing the first source material at the rate $r_H$ and the second source material at the rate $r_L$ for a time interval $T = d/(r_H + r_L)$. A method of depositing a gradient index optical coating with a predetermined refractive index profile n(d) which is a function of depth d in the coating uses a first source material having a refractive index $n_H$ and a known rate of deposition $r_H$ and a second source material having a refractive index $n_L$ and a variable rate of deposition $r_L$. The method includes the steps of setting the initial depth d to 0, then calculating the deposition rate $r_L(d)$ for the depth d according to the equation.

$$r_L(d) = \frac{(n_H^2 - n^2(d))}{(n^2(d) - n_L^2)} r_H.$$

The first source material is then deposited at the rate $r_H$ and the second source material at the rate $r_L(d)$ for a time interval $\Delta t$. At the end of the time interval, the depth d is updated by adding an amount $\Delta d = (r_H + r_L(d)) \Delta t$. The steps of calculating, depositing, and updating are repeated until the predetermined refractive index profile is achieved.

8 Claims, 1 Drawing Sheet

OTHER PUBLICATIONS

Dobrowolski, Completely Automatic Synthesis of Optical Thin Film Systems, Applied Optics, vol. 4, p. 937 (1965).

Epstein, The Design of Optical Filters, Journal of the Optical Society of America, vol. 42, p. 806 (1952).

Hauge, et al., Design and Operation of ETA, an Automated Ellipsometer, IBM Journal of Research & Development, p. 472 (Nov., 1973).

Hottier, et al., In Situ Monitoring by Ellipsometry of Meta-Organic Epitaxy of GaAlAs-GaAs Superlattice, J. of Applied Physics, vol. 51, p. 1599 (Mar., 1980).

Minot, Single-Layer, Graded Refractive Index Antireflection Films Effective from 0.35 to 2.5 u., J. of Optical Soc. of America, vol. 66, p. 515 (1976).

Netterfield et al., Characterization of Growing Thin Films by In Situ Ellipsometric, Spectral Reflectance and Transmittance Measurements, and Ion-Scattering Spectroscopy, Review of Scientific Instruments, vol. 56, p. 1995 (1985).

Snedaker, New Numerical Thin-Film Synthesis Technique, Journal of the Optical Society of America, vol. 72, p. 1732 (1982).

Southwell, Coating Design Using Very Thin High-and Low-Index Layers, Applied Optics, vol. 24, p. 457 (1985).

Southwell, Gradient-Index Antireflection Coatings, Optics Letters, vol. 8, p. 584 (Nov., 1983).

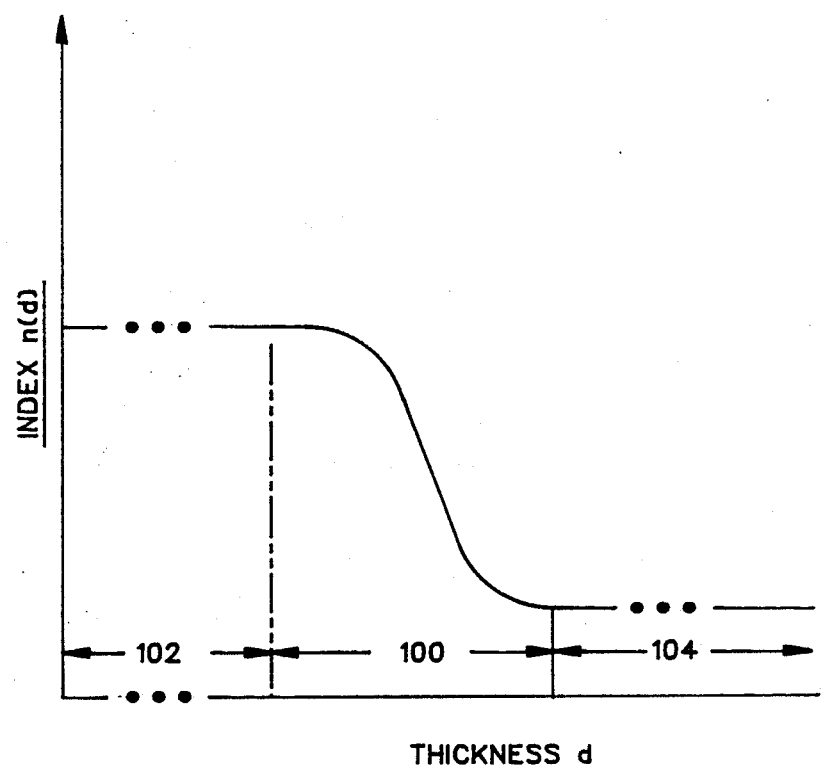

DEPOSITION OF GRADIENT INDEX COATINGS USING COEVAPORATION WITH RATE CONTROL

BACKGROUND OF THE INVENTION

This invention relates to the design of optical coatings for controlling the manner in which light of particular wavelengths is transmitted by or reflected from an optical surface.

The phenomenon of optical interference, which causes modifications in the transmitted and reflected intensities of light, occurs when two or more beams of light are superposed. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil.

One important practical application for interference effects in thin films involves the production of coated optical surfaces. If a film of a transparent substance is deposited on glass, for example, with a refractive index which is properly specified relative to the refractive index of the glass and with a thickness which is one-fourth of a particular wavelength of light in the film, the reflection of that wavelength of light from the glass surface can be almost completely suppressed. The light which would otherwise be reflected is not absorbed by a nonreflecting film; rather, the energy in the incident light is redistributed so that a decrease in reflection is accompanied by a concomitant increase in the intensity of the light which is transmitted.

Considerable improvements have been achieved in the antireflective performance of such films by using a composite film having two or more superimposed layers. In theory, it is possible with this approach to design a wide range of multiple-layer interference coatings for obtaining a great variety of transmission and reflection spectrums. This has led to the development of a large number of new optical devices making use of complex spectral filter structures. Antireflection coatings, laser dielectric mirrors, television camera edge filters, optical bandpass filters, and band-rejection filters are some of the examples of useful devices employing thin-film interference coatings.

Frequently two different materials are used in fabricating such a composite film, one with a relatively high index of refraction and the other with a relatively low index of refraction. The two materials are alternately deposited to specified thicknesses to obtain the desired optical characteristics for the film. The deposition process is typically controlled by monitoring the thickness of each layer as it is deposited and terminating the deposition when the layer reaches the correct thickness. Some advanced applications of optical technology, however, require antireflective films which adhere more closely to theoretically specified refractive index profiles, to exhibit even lower levels of reflection than have previously been attainable in the art. The use of layers having intermediate values of refractive index, which requires the coevaporation of two materials, or of a gradient index coating, in which the index of refraction within the coating is made to vary continuously as a function of depth in the layer, further increases the degrees of freedom available in the design of such films. When the coating design calls for a layer of intermediate index or a gradient-index layer, the thickness monitoring technique of depositing optical coatings may not be sufficient to ensure the accuracy of the deposited layer.

SUMMARY OF THE INVENTION

A method of depositing an optical coating with a predetermined refractive index n and a thickness d, using a first source material having a refractive index $n_H$ greater than n and a known rate of deposition $r_H$ and a second source material having a refractive index $n_L$ less than n and a variable rate of deposition $r_L$, comprises the steps of calculating the deposition rate $r_L$ according to the equation $$r_L = \frac{(n_H^2 - n^2)}{(n^2 - n_L^2)} r_H$$

and depositing the first source material at the rate $r_H$ and the second source material at the rate $r_L$ for a time interval $T = d/(r_H + r_L)$.

A method of depositing a gradient index optical coating with a predetermined refractive index profile n(d) which is a function of depth d in the coating uses a first source material having a refractive index $n_H$ and a known rate of deposition $r_H$ and a second source material having a refractive index $n_L$ and a variable rate of deposition $r_L$. The method includes the steps of setting the initial depth d to 0, then calculating the deposition rate $r_L(d)$ for the depth d according to the equation $$r_L(d) = \frac{(n_H^2 - n^2(d))}{(n^2(d) - n_L^2)} r_H.$$

The first source material is then deposited at the rate $r_H$ and the second source material at the rate $r_L(d)$ for a time interval $\Delta t$. At the end of the time interval, the depth d is updated by adding an amount $\Delta d = (r_H + r_L(d)) \Delta t$. The steps of calculating, depositing, and updating are repeated until the predetermined refractive index profile is achieved.

In more particular embodiments, the known rate of deposition $r_H$ may be a constant rate of deposition.

DESCRIPTION OF THE DRAWINGS

The drawing FIGURE is a plot of the refractive index of a hypothetical optical coating.

DESCRIPTION OF THE INVENTION

This invention is concerned with the deposition of two coevaporated materials, using rate monitoring of the material sources to control the optical qualities of the deposited film.

In general an optical coating having a gradient-index distribution is characterized by a continuously varying index of refraction, as indicated in the drawing FIGURE, which is a plot of the refractive index of a hypothetical optical coating 100 deposited on a substrate 102 and providing an interface between the substrate and an ambient environment 104. The substrate might be, for example, the glass of an optical lens, while the ambient environment could be air. The refractive index n(t) of the hypothetical coating is plotted on the vertical axis as a function of the thickness of the coating on the horizontal axis (those skilled in the art will appreciate that the horizontal scale of thickness is greatly exaggerated relative to the vertical scale of refractive index).

The digital ultrathin-film equivalence concept (see Southwell, Coating Design Using Very Thin High- and Low-Index Layers, Applied Optics, Volume 24, Page 457 (1985)), allows a coating with the approximate equivalent of such a gradient-index profile to be fabricated using real materials with specific indices of refraction. In this approach, the theoretical gradient-index profile is first quantized into thin discrete layers. Assume, for example, a thin layer with a thickness D and a refractive index n at the center of thickness of the layer. The value n is assumed to be the effective value of refractive index over the entire interval of the gradient-index profile represented by the layer. That is, $$n = n(D/2) \qquad (1)$$

where the parenthetical expression indicates that the function n is evaluated at the point D/2. Each layer is then further divided into an equivalent high-index/low-index pair, using a first layer made from a material having a relatively low index of refraction, with a thickness $d_L$ and a refractive index $n_L$, and a second layer of a material having a higher index of refractive, with a thickness $d_H$ and a refractive index $n_H$.

The thin film equivalence principle specifies the thickness $d_L$ of the low-index material as $$d_L = \frac{(n_H^2 - n^2)}{(n_H^2 - n_L^2)} D \qquad (2)$$

and the thickness $d_H$ of the high-index layer as $$d_H = D - d_L. \qquad (3)$$

to obtain a layer pair which will behave optically as if it were a layer of refractive index n(D/2) and thickness D.

Using the layer thicknesses specified by Equations (2) and (3), a multiple-layer ultrathin-film coating may be fabricated by alternately depositing the two materials. Typically the deposition is accomplished by heating the source materials in a vacuum chamber containing the surface to be coated. The heating increases the vapor pressure of the source materials, and if the vacuum chamber pressure is sufficiently low that the molecular mean free path is greater than the source-to-target distance, the source materials will be deposited on the target surface. Either source can be mechanically blocked from the view of the target, while the heating of the source material, the choice of the source material, and the duration of the vapor deposition can be controlled automatically. Through the use of an ellipsometer (see, e.g., U.S. patent application Ser. No. 884,689, filed July 11, 1986), the present state of the art permits the deposition of ultrathin layers on the order of 100 Angstroms whose thickness can be measured to within a few Angstrom units (1 Angstrom = $10^{-8}$ centimeter). Ellipsometer measurements typically take only a few seconds, allowing the entire film deposition process to be controlled by a computer.

Assuming that the two source materials mix cleanly without chemically combining to form new compounds, and further assuming that the optical refractive index of the mixed materials is the same as if they were being paired as thin layers, this same digital equivalent approach can be used to specify the proper conditions for coevaporation. The two materials can thus be evaporated together to form layers with an arbitrary refractive index where, for example, a layer having a refractive index different from any available material is required, or to continuously change the refractive index so that a gradient index coating can be deposited. The index n and thickness d of a coevaporated layer, again using the thin layer equivalence principle, are given by:

$$n^2 = \frac{n_L^2 d_L + n_H^2 d_H}{d_L + d_H} \qquad (4)$$

$$d = d_L + d_H \qquad (5)$$

In other words, if a low index material with the index of refraction $n_L$ is coevaporated with a high index material with the index of refraction $n_H$ for a short time interval, the refractive index n of the deposited layer can be calculated from the refractive indices and thicknesses which would result from separately depositing the high index and low index materials, while the total thickness d of the resulting layer is the sum of the thicknesses of the equivalent separate layers.

In terms of the deposition rates $r_L$ and $r_H$ for the two materials and the time T over which the deposition occurs, the thicknesses of the separate layers would be:

$$d_H = r_L T$$

$$d_H = r_H T \qquad (6)$$

Combining Equations (4) and (6), the index n of the coevaporated increment is:

$$n^2 = \frac{n_L^2 r_L + n_H^2 r_H}{r_L + r_H} \qquad (7)$$

Thus, if the deposition rates of the low and high index materials are known, the index of the mixed layer can be calculated. The thickness d of this incremental layer is given by:

$$d = (r + r_H) T \qquad (8)$$

which depends as well on the time of deposition T.

Suppose an incremental layer of thickness d and index n is required in the specification of a gradient-index coating. It is necessary to determine the rates for each source material and the deposition time to achieve the specified increment. There are two equations (Equations (7) and (8)) and three unknowns ($r_L$, $r_H$, and T), so there is not a unique solution. Suppose, however, that the high index material has a rate of deposition $r_H$ which is reliably constant or otherwise well characterized (those skilled in the art will appreciate that one could equally well assume that the low index material has a well known rate of deposition). If this is the case, $r_H$ can simply be considered a known quantity which can be substituted in the equations to solve for the rate $r_L$ and the time T. Solving Equation (6) for $r_L$ yields:

$$r_L = \frac{(n_H^2 - n^2)}{(n^2 - n_L^2)} r_H \qquad (9)$$

Since this expression for $r_L$ does not depend on time, the refractive index of the layer being deposited will remain fixed as long as the deposition rates are constant. The thickness of the incremental layer is determined by the time interval according to Equation 8).

These results apply to an increment of arbitrary but constant index and thickness. With this approach, the following deposition procedure could be used:

I. Quantize the gradient-index profile into small steps, each having a constant index of refraction.

II. With the substrate shutter closed, establish the rates $r_H$ and $r_L$ for the index n of a quantized layer using Equation (9).

III. Open the shutter for a clocked time $T=d/(r_L+r_H)$ and allow the source materials to deposit on the substrate.

IV. After the time T has elapsed, close the shutter.

V. Repeat steps II–IV for each incremental step until the complete profile is deposited.

This procedure will permit the deposition of layers having refractive indices at intermediate values between the indices of the deposition materials used. For many applications, this procedure will enable the production of higher quality optical coatings. The coatings which result, however, exhibit a stepped analog or stepped index profile. Moreover, the periods during which the substrate shutter is closed during this procedure invite contamination and waste source material while the system is waiting for new rates to be calculated. It is an outstanding feature of this invention to provide a more versatile technique which will also permit the continuous deposition of an optical coating with a continuously varying index profile.

In order to implement a continuous deposition procedure, the time dependence of the deposition rates must be considered. To account for this time dependence, Equation (8) must be generalized, so that the layer thickness d is given by:

$$d = \int_0^T (r_L + r_H)dt \qquad (10)$$

which is the integral of the deposition rates over the time T.

Next, the time dependence of the rates must be derived. This dependence is determined by the index profile which must be generated. To make the problem manageable, it is assumed that $r_H$ is constant, i.e., independent of time. It is also assumed that an arbitrary continuous index profile is to be deposited:

$$n = n(d) \quad (d=0 \text{ at the substrate}) \qquad (11)$$

Furthermore, let $d_{max}$ be the total thickness of the gradient index layer. Note that the depth variable d is measured from the substrate. The depth dependence of the rate is therefore given by Equations (9) and (11):

$$r_L(d) = \frac{(n_H^2 - n^2(d))}{(n^2(d) - n_L^2)} r_H \qquad (12)$$

The time dependence of the rate is needed. Thus the depth d must be replaced by its relationship to time, as given in Equation (10).

Equation (10) assumes that the time dependence is known, whereas Equation (12) provides the depth dependence. The objective is to obtain the time dependence for $r_L$, i.e., how can one continuously vary $r_L$ with a given constant $r_H$ such that the gradient-index profile n(d) is generated?

It might at first appear obvious to make a gradient-index layer by varying the rate in the same fashion that the index changes. An examination of Equations (10) and (12), however, reveals that giving the deposition rate a time dependence the same as the depth dependence for the index will not produce a correct result, since there is not a linear relationship between time and depth dependence.

Because of the implicit time dependence in Equations (10) and (12), there does not appear to be an easy way to obtain the explicit closed form expression for $r_L$ as a function of time for arbitrary gradient-index profiles. That is not a significant impediment, however, because a digital computer can still return correct values for $r_L$ at each time interval. The procedure is as follows:

A gradient index optical coating with a predetermined refractive index profile n(d) which is a function of depth d in the coating is to be deposited, using a first source material having a refractive index $n_H$ and a constant rate of deposition $r_H$ and a second source material having a refractive index $n_L$ and a variable rate of deposition $r_L$. The procedure includes the steps of:

I. Setting the initial depth d to 0.

II. Calculating the deposition rate $r_L(d)$ for the depth d according to the equation $$r_L(d) = \frac{(n_H^2 - n^2(d))}{(n^2(d) - n_L^2)} r_H;$$

III. Depositing the first source material at the rate $r_H$ and the second source material at the rate $r_L(d)$ for a time interval $\Delta t$;

IV. Updating the depth d by adding an amount $$\Delta d = (r_H + r_L(d))\Delta t; \text{ and}$$

V. Repeating the steps of calculating, depositing, and updating until the predetermined refractive index profile is achieved.

The above procedure assumes that the rate controller which is used in the deposition apparatus can quickly establish the specified deposition rate $r_L$. If the clock interval $\Delta t$ is small and if the index gradients are gradual, this assumption is valid. If there is a significant time lag in the rate change, however, the procedure can readily be modified to compensate for the lag.

The preferred embodiments of this invention have been illustrated and described above. Modifications and additional embodiments, however, will undoubtedly be apparent to those skilled in the art. In some applications, for example, the deposition rate of the low index material may be more stable and thus should be treated as the known rate rather that that of the high index material. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

Southwell, Coating Design Using Very Thin High- and Low-Index Layers, Applied Optics, Volume 24, Page 457 (1985).

U.S. patent application, Ser. No. 884,689, filed July 11, 1986.

I claim:

1. A method of depositing an optical coating with a predetermined refractive index n and a thickness d, using a first source material having a refractive index $n_H$ greater than n and a known rate of deposition $r_H$ and a second source material having a refractive index $n_L$ less than n and a variable rate of deposition $r_L$, comprising the steps of:

calculating the deposition rate $r_L$ according to the equation $$r_L = \frac{(n_H^2 - n^2)}{(n^2 - n_L^2)} r_H$$

and depositing the first source material at the rate $r_H$ and the second source material at the rate $r_L$ for a time interval $$T = d/(r_H + r_L).$$

2. The method of claim 1, wherein the known rate of deposition $r_H$ is a constant rate of deposition.

3. An optical coating with a predetermined refractive index n and a thickness d, made by the method of depositing a first source material having a refractive index $n_H$ greater than n and a known rate of deposition $r_H$ and a second source material having a refractive index $n_L$ less than n and a variable rate of deposition $r_L$, comprising the steps of:

calculating the deposition rate $r_L$ according to the equation $$r_L = \frac{(n_H^2 - n^2)}{(n^2 - n_L^2)} r_H$$

and depositing the first source material at the rate $r_H$ and the second source material at the rate $r_L$ for a time interval $$T = d/(r_H + r_L).$$

4. The method of claim 2, wherein the known rate of deposition $r_H$ is a constant rate of deposition.

5. A method of depositing a gradient index optical coating with a predetermined refractive index profile n(d) which is a function of depth d in the coating, using a first source material having a refractive index $n_H$ and a known rate of deposition $r_H$ and a second source material having a refractive index $n_L$ and a variable rate of deposition $r_L$, comprising the steps of:

setting the initial depth d to 0;

calculating the deposition rate $r_L(d)$ for the depth d according to the equation $$r_L(d) = \frac{(n_H^2 - n^2(d))}{(n^2(d) - n_L^2)} r_H$$

depositing the first source material at the rate $r_H$ and the second source material at the rate $r_L(d)$ for a time interval $\Delta t$;

updating the depth d by adding an amount $$\Delta d = (r_H + r_L(d)) \Delta t; \text{ and}$$

repeating the steps of calculating, depositing, and updating until the predetermined refractive index profile is achieved.

6. The method of claim 5, wherein the known rate of deposition $r_H$ is a constant rate of deposition.

7. A gradient index optical coating with a predetermined refractive index profile n(d) which is a function of depth d in the coating, made by the method of depositing a first source material having a refractive index $n_H$ and a known rate of deposition $r_H$ and a second source material having a refractive index $n_L$ and a variable rate of deposition $r_L$, comprising the steps of:

setting the initial depth d to 0;

calculating the deposition rate $r_L(d)$ for the depth d according to the equation $$r_L(d) = \frac{(n_H^2 - n^2(d))}{(n^2(d) - n_L^2)} r_H$$

depositing the first source material at the rate $r_H$ and the second source material at the rate $r_L(d)$ for a time interval $\Delta t$;

updating the depth d by adding an amount $$\Delta d = (r_H + r_L(d)) \Delta t; \text{ and}$$

repeating the steps of calculating, depositing, and updating until the predetermined refractive index profile is achieved.

8. The coating of claim 7, wherein the known rate of deposition $r_H$ is a constant rate of deposition.

* * * * *